United States Patent
Napchi et al.

(10) Patent No.: US 10,650,402 B2
(45) Date of Patent: May 12, 2020

(54) MULTI-DIMENSIONAL REAL-TIME BIDDING

(71) Applicant: HIRO Media Ltd., Tel-Aviv (IL)

(72) Inventors: Ariel Napchi, Tel-Aviv (IL); Oded Napchi, Tel-Aviv (IL); Hed Bar-Nissan, Tel-Aviv (IL); Alan Oken, RaAnana (IL); Shahar Daniel, Tel-Aviv (IL)

(73) Assignee: HIRO Media Ltd., Tel-Aviv (IL)

( * ) Notice: Subject to any disclaimer, the term of this patent is extended or adjusted under 35 U.S.C. 154(b) by 541 days.

(21) Appl. No.: 14/532,043

(22) Filed: Nov. 4, 2014

(65) Prior Publication Data
US 2015/0127448 A1    May 7, 2015

Related U.S. Application Data

(60) Provisional application No. 61/899,319, filed on Nov. 4, 2013.

(51) Int. Cl.
*G06Q 30/02* (2012.01)

(52) U.S. Cl.
CPC ..... *G06Q 30/0243* (2013.01); *G06Q 30/0275* (2013.01)

(58) Field of Classification Search
CPC .................................................. G06Q 30/00
See application file for complete search history.

(56) References Cited

U.S. PATENT DOCUMENTS

| | | | | |
|---|---|---|---|---|
| 7,882,046 B1* | 2/2011 | Kizhakkekalathil | ... | G06N 20/00 706/12 |
| 8,082,174 B1* | 12/2011 | Kamangar | ......... | G06Q 30/0207 705/14.1 |
| 8,280,765 B2* | 10/2012 | Shields | .............. | G06Q 30/0275 705/14.1 |
| 8,473,346 B2* | 6/2013 | Mattern | ................. | G06Q 30/02 705/14.43 |
| 9,202,248 B2* | 12/2015 | Bi | .......................... | G06Q 30/02 |
| 2007/0192194 A1* | 8/2007 | O'Donnell | ............. | G06Q 30/02 705/14.41 |
| 2008/0103898 A1* | 5/2008 | Flake | ..................... | G06Q 30/02 705/14.41 |
| 2008/0103953 A1* | 5/2008 | Flake | ..................... | G06Q 30/02 705/37 |
| 2008/0270164 A1* | 10/2008 | Kidder | ................... | G06Q 30/02 705/14.4 |
| 2009/0234713 A1* | 9/2009 | Bi | .......................... | G06Q 30/02 705/14.54 |
| 2010/0124907 A1* | 5/2010 | Hull | ....................... | G06Q 30/02 455/412.1 |
| 2010/0223141 A1* | 9/2010 | Spencer | ................ | G06Q 30/02 705/14.71 |

(Continued)

*Primary Examiner* — Eric R Netzloff

(57) ABSTRACT

A method of selecting an advertisement (ad) network for providing promotional content to be presented in an ad spot, comprising: monitoring the performance of response to ad requests for embedding ads in ad spots for each ad networks; assigning a performance score to each ad networks based on the monitoring; constructing a ranked set of data values of the ad networks for a bidding process according to the performance score of each ad network and bid responses received by each ad network; and selecting an ad network according to the ranked set of data values.

14 Claims, 2 Drawing Sheets

(56) References Cited

U.S. PATENT DOCUMENTS

| | | | |
|---|---|---|---|
| 2010/0228635 A1* | 9/2010 | Ghosh | G06Q 30/02 |
| | | | 705/14.71 |
| 2011/0055001 A1* | 3/2011 | Mattern | G06Q 30/02 |
| | | | 705/14.43 |
| 2011/0066488 A1* | 3/2011 | Ludewig | G06Q 30/00 |
| | | | 705/14.43 |
| 2011/0238493 A1* | 9/2011 | Ghosh | G06Q 30/02 |
| | | | 705/14.46 |
| 2012/0059696 A1* | 3/2012 | Theberge | G06Q 30/02 |
| | | | 705/14.4 |
| 2012/0197711 A1* | 8/2012 | Zhou | G06O 30/0241 |
| | | | 705/14.41 |
| 2013/0085862 A1* | 4/2013 | Gorsline | G06Q 30/02 |
| | | | 705/14.61 |
| 2014/0081742 A1* | 3/2014 | Katsur | G06Q 30/0241 |
| | | | 705/14.46 |

* cited by examiner

MULTI-DIMENSIONAL REAL-TIME BIDDING

RELATED APPLICATION

This application claims the benefit of priority under 35 USC 119(e) of U.S. Provisional Patent Application No. 61/899,319 filed on Nov. 4, 2013, the contents of which are incorporated herein by reference in their entirety.

FIELD AND BACKGROUND OF THE INVENTION

The present invention, in some embodiments thereof, relates to real-time bidding and, more particularly, but not exclusively, to automatically optimized real-time bidding of advertisement (ad) networks on ad spots.

Maximizing the usage of ad spots inventory is a requirement of online advertisement. Ad inventory is usually supplied by ad networks paid by advertisers but do not guarantee to provide and play their ad in an ad spot. Ad networks are usually characterized by fluctuations in the rate of ads provided and in latency. In addition, sometimes an ad network replies to an ad request with an ad, breaks the bidding sequence, but fails to provide an ad.

In current real-time bidding processes, on-going manual modifications of the bidding sequence are done to minimize these damages.

SUMMARY OF THE INVENTION

According to some embodiments of the present invention there is provided a method of selecting an advertisement (ad) network for providing promotional content to be presented in an ad spot, comprising: monitoring a performance in a response to at least one ad request for embedding an ad in an ad spot for each of a plurality of ad networks; assigning a performance score to each of said plurality of ad networks based on said monitoring; constructing a ranked set of data values of said plurality of ad networks for a bidding process according to said performance score of each of said plurality of ad networks and a plurality of bid responses received by each of said plurality of ad networks; and selecting an ad network from said plurality of ad networks according to said ranked set of data values.

Optionally, the method further comprises updating said performance score of said selected ad network according to a performance of said selected ad network, to be used in future selections.

Optionally, the method further comprises selecting another ad network according to said ranked set of data values when said selected ad network fails to to provide an ad after said selecting of said ad network.

Optionally, said performance score is calculated according to at least one performance parameter determined during said monitoring.

More optionally, said at least one performance parameter include a total number of impressions on ads delivered by a specific ad network in relation to the number of requests sent to said specific ad network.

More optionally, said at least one performance parameter include a number of lost requests by a specific ad network in relation to a number of requests sent to said specific ad network.

More optionally, said at least one performance parameter include mean transfer time for responses received from said specific ad network.

More optionally, said at least one performance parameter include a number of displayed ads in relation to a number of requests made to said specific ad network.

More optionally, each of said at least one performance parameter is given different weight in said calculation of said performance score.

Optionally, said constructing of said ranked set of data values further include considering ad spot parameters according to preferences defined by at least one of said plurality of ad networks.

More optionally, said ad spot parameters include at least one of click-through rate and view-through rate in relation to said ad spot.

More optionally, at least one of said plurality of ad networks is removed from said ranked set of data values according to said preferences.

According to an aspect of some embodiments of the present invention there is provided a computer readable medium comprising computer executable instructions adapted to perform the method.

According to some embodiments of the present invention there is provided an advertisement (ad) system of selecting a promotional content to be presented in an ad spot, comprising: a monitoring module which evaluates a plurality of performance parameters for each of a plurality of ad networks; a database hosting said performance parameters for said plurality of ad networks; an interface which receives an ad request for embedding ad in an ad spot; sends said request to said plurality of ad networks; to receives bids for said ad spot from said plurality of ad networks; and sends a response for said ad request; a selection module which constructs a ranked set of data values of said plurality of ad networks according to said performance parameters and said bids and selects a selected ad network for responding to said ad request.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
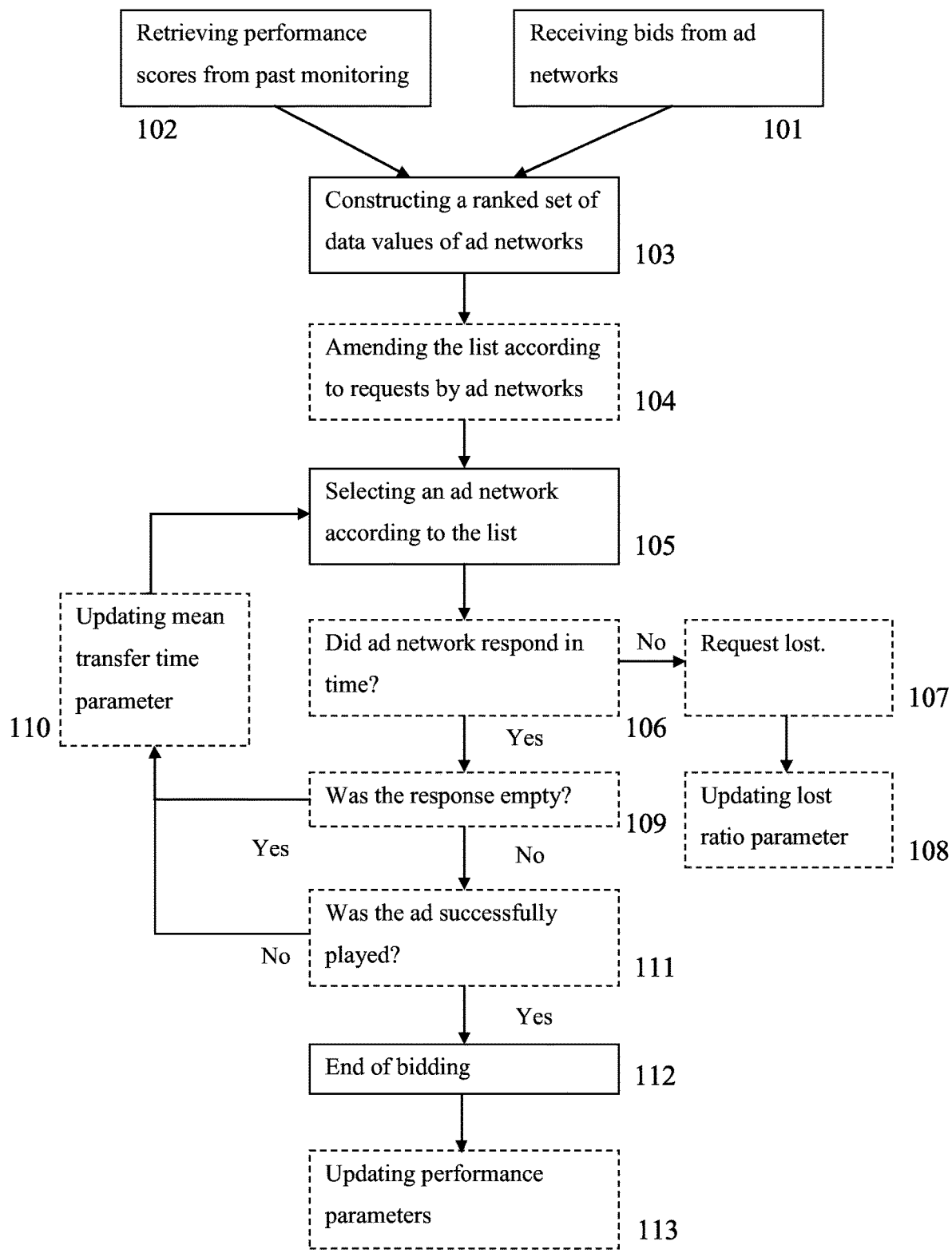
FIG. 1 is a flowchart schematically representing a method for selecting an advertisement (ad) network for providing promotional content to be presented in an ad spot, according to some embodiment of the present invention.

The present invention, in some embodiments thereof, relates to real-time bidding and, more particularly, but not exclusively, to automatically optimized real-time bidding of advertisement (ad) networks on ad spots.

According to some embodiments of the present invention, there are provided methods and systems of selecting ad network for providing in-stream ad for embedding in a media content item. In-stream ads are displayed as a break and as non-linear overlay before, after or during a media content item such as a video. In these embodiments, a bidding process on an ad spot by competing ad networks is performed and includes monitoring the performance of these ad networks. The resulting data of the monitoring of past biddings is incorporated in the selection of the ad network to provide the in-stream ad.

This maximizes the usage of ad inventory and ad spots inventory. This also has the advantage of minimizing manual involvement in the bidding sequence and thus simplifying the management of ad networks.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The to invention is capable of other embodiments or of being practiced or carried out in various ways.

Reference is now made to FIG. 1, which is a flowchart schematically representing a method of selecting an ad network for providing promotional content to be presented in an ad spot, according to some embodiment of the present invention.

The ad spot is optionally a part of a webpage, an application, a video and/or search results on top different client platforms including browsers, mobile devices and television device. The ad network is optionally blind network, vertical network, media company, media agency, media agency group, ad exchanger or technology vendor.

The promotional content optionally includes one or more in-stream ad(s), such as video and/or audio clip(s), for example pre-roll, mid-roll, and/or post-roll, video overlays, for example interactive small web format (SWF) file that allows adding additional functionality to a displayed content (i.e. clicking the overlay pops up a browser window directed to a selected address), interactive user interfaces, for example a share button that allows users to share the content, banner, text content and/or an audible overlay that is added to an audio file and/or to the soundtrack of a multimedia file. The promotional content may also include ad bundles (combination of several ads in a session such as pre-roll, overlay, reroll, postroll etc.), skip ad and/or minimize and restore ads options, engagement monitoring, user unique capping restriction and/or banner companions.

First, as shown at 101, bids are received from ad networks in response to a request, such as an ad request, for an in-stream advertisement to be loaded with reference to a certain media content item. This request is optionally generated during the loading of a requested media content item, such as streamed and/or downloaded audio and/or video content, and distributed to the ad networks. Optionally, the bids are received in the form of cost per mille (CPM), mille usually representing one thousand impressions of the ad.

Also, as shown at 102, performance scores of the ad networks from past monitoring are retrieved, for example from a database. The performance scores are optionally calculated according to performance parameters determined during the monitoring of past selection processes in real-time bidding, for example during the past 1, 12 and 24 hours and/or 1, 2, 10, and/or 100 days or any intermediate or longer period. These performance parameters optionally include:

impressions per request—the total number of impressions on ads delivered by an ad network in relation to the number of requests sent to the ad network, for example 1, 100, 10000, 1000000 or any intermediate or higher number;

lost ratio—the number of lost requests by an ad network in relation to the number of requests sent to the ad network, for example 0.01, 0.1, 0.3 or any number larger than 0 and smaller or equals to 1.0;

mean transfer time for responses received from an ad network, for example 1, 10, 100, 1000 milliseconds or any intermediate or longer time; and fill rate ratio—the number of billable ads displayed in relation to the number of requests made to the ad network.

Optionally, the performance score of an ad network is calculated by adding the impressions per request to the multiplication of the mean transfer time and a weight parameter, and subtracting the multiplication of the lost ratio and another weight parameter.

Optionally, the weight parameters are determined and optimized manually using an offline algorithm. The weight factors are applied to all ad networks and are updated and improved from time to time by checking different scoring formulas on live portions of the traffic and comparing results of profitability measurements and success measurements such as view-through rate (VTR).

Then, as shown at 103, a ranked set of data values, such as a prioritized list, wherein each data value is a score or a rank or a priority of one of the ad networks, is constructed based on calculated performance scores. Optionally, the place of each ad network is determined as a function of the multiplication of automatically gathered or manually determined priority given to the ad network (often simply the average CPM received by the ad network) and the performance score calculated for this ad network, which may be referred to herein as effective CPM (ECPM), for example 0.5, 5, 50 dollars, or any other smaller, intermediate or higher cost.

Optionally, as shown at 104, the ranked set of data values is amended so that preferences made by ad networks are taken into consideration. Optionally, ad spot parameters are used in these preferences, such as click-through rate (CTR) and view-through rate (VTR), which are determined by data previously collected about the ad spot. Optionally, the preferences may be based on validity and quality assessments such as internet protocol (IP) validation, domain, user agent and/or ad visibility factors to (active tab, above/bellow the fold). Data of user interaction as a result of an ad impression, used for determining VTR, for example, can be collected in many levels of sources, such as: content provider, ad spot, placement of the ad in the media content item, placement of the ad in respect to other ads and/or previously viewed ads by the user loading the media content item. For example, if an ad network prefers to provide ads for ad spots with high VTR, ECPM of this ad network is increased, for example by 10%, 20% or 30%. This improves the satisfaction of ad networks when targeting their ads to ad spots which provide good performance on their unique specification.

Optionally, an ad network is completely removed from the ranked set of data values if ad spot parameters do not suitable for the ad network's preferences, for example, poor CTR.

Optionally, additional demands of the ad networks are considered, such as preference to spread ads evenly throughout the serving period, boosting under-performing guaranteed impressions volumes and/or enforcing restrictions such as geomarketing, domain, frequency capping at break, session and/or user levels.

Now, as shown at 105, the first ad network in the ranked set of data values is selected to provide an ad and play it in the ad spot.

Optionally, as shown at 106-111, ad network performance in providing an ad and playing the ad is monitored. Optionally, as shown at 106, response time is monitored. If the ad network failed to respond in within the time limit of the ad spot, the request is lost, the bidding sequence is broken and no ad is presented, as shown at 107. Then, as shown at 108, the lost ratio parameter of the ad network is optionally updated to include the current lost request. Else, as shown at 109, the response itself is monitored. If the response is empty and includes no ad to be played, as shown at 110, the mean response time parameter of the ad network is optionally updated to include the current response time.

Fill rate is monitored in real time after the ad is successfully played, as shown in 111. Actual impressions collected relative to the number of request attempts made to the ad network during the bidding phase.

Also, optionally, to avoid non-utilization of an ad spot, the next ad network in the ranked set of data values is selected to provide an ad and play it in the ad spot, as shown at 105, and the process then continues from this stage, as shown at 106. This minimizes the financial damage done to advertisers that are paying the ad spots to providers (publishers) regardless of their success in providing or playing ads.

Else, as shown at 111, playing of the ad by the ad network is monitored. If the ad network fails to play the ad, mean response time parameter is optionally updated and, optionally, the next ad network is selected, as shown at 110 and described above. Else, as shown at 112, the ad is played and bidding process in ended.

Then, as shown at 113, performance parameters of the ad network which played the ad are updated to include the performance of this ad network in the current process.

Also, the collected monitoring data may be used to block flooding of the ad networks with ad requests, for example, in case of server issues on the ad network side, or minimal fill rate constraints. In that case, monitoring is optionally done by sampling a minimal portion of the real traffic of the ad networks.

Figure 2:
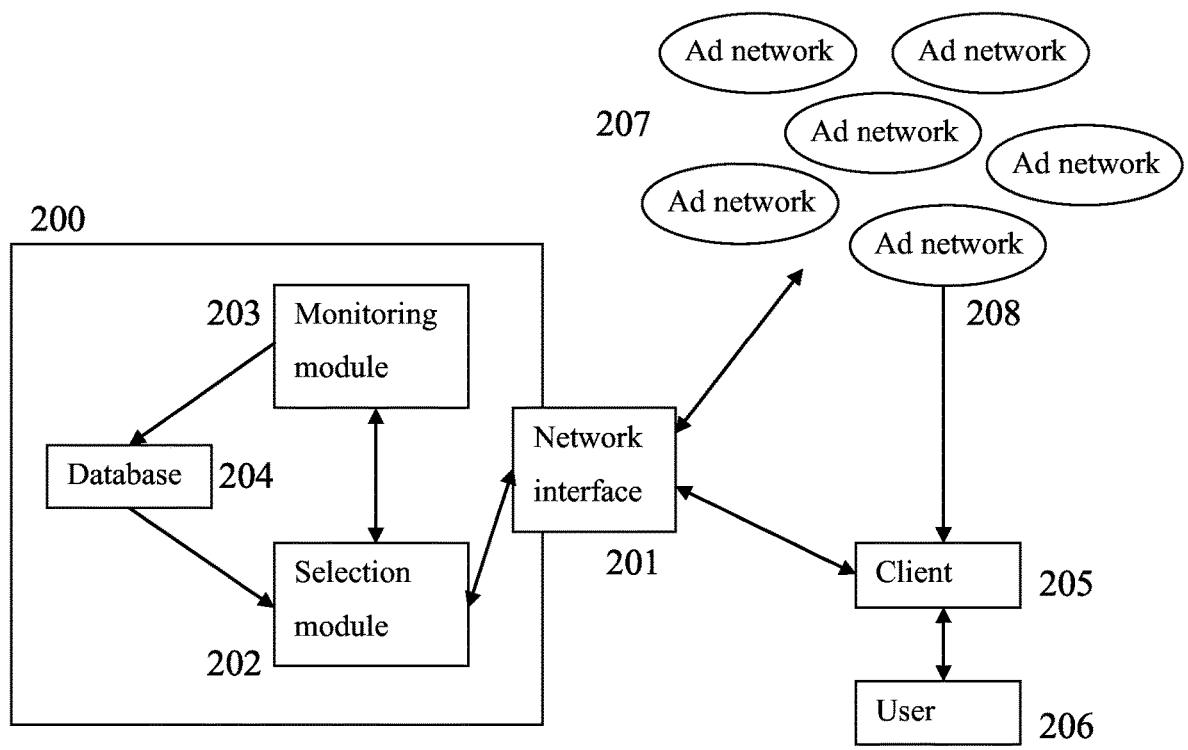
FIG. 2 is an advertisement system of selecting an ad network for providing promotional content to be presented in an ad spot, according to some embodiment of the present invention.

Reference is also made to FIG. 2, which is an advertisement system 200 of selecting an ad network for providing promotional content to be presented in an ad spot, according to some embodiment of the present invention. The system is optionally implemented on one or more network servers. Optionally, system 200 may be loaded by a content provider (publisher).

System 200 includes a network interface 201, such as a physical network port, for example a network interface card (NIC) that functions as an input and output module for receiving promotional content requests, such as ad requests, sending the requests to ad networks, receiving bids from the ad networks and sending responses for ad requests.

The network interface 201 is connected to a client 205, for example through a network interface of the content provider, which is optionally a server managing one or more media content items accessed by a user 206. Client 205 may be, for example, a mobile application on a phone and/or tablet computer, webpage containing flash, hypertext markup language (HTML) and/or JavaScript, computer program and/or television device. Network interface 201 receives an ad request from client 205. The ad request may be in any form, including a request for a video ad, an audio ad, a text ad, and/or a banner. Network interface 201 then sends the ad request to ad networks 207 and receives a bid from each of ad networks 207.

System 200 further includes a selection module 202 which constructs a ranked set of data values of ad networks 207 and selects an ad network 208 for to providing the ad requested. The ranked set of data values is constructed based on past monitoring done by a monitoring module 203 and stored in a database 204 to be provided to selection module 202 upon construction of the ranked set of data values.

Data stored in database 204 include performance parameters of each of ad networks 207. For example, the database 204 includes a table of ad networks 207 and corresponding performance parameters.

Selected ad network 208 is then instructed by network interface 201 to provide an ad to be presented by client 205 to user 206. The process of this providing is monitored by monitoring module 203 and the outcome of the monitoring is stored in database 204.

Optionally, bidding is done on client 205 after it receives the ranked set of data values from network interface 201. Optionally, bidding is done by system 200, for example, when client 205 has limited capabilities, such as a television device.

Optionally, if selected ad network 208 fails to provide the ad, monitoring module 203 records the failure and selection module 202 selects a new ad network to provide the ad.

In an exemplary process of ad network selection in a real-time bidding, according to some embodiment of the present invention, an ad request for embedding a mid-roll video ad in a content video is received by the system's network interface from the provider of the content video, during the loading of the content video by a user. The network interface then sends the ad request to Ad network 1, Ad network 2 and Ad network 3. Bids are received from the ad networks, Ad network 1 having the highest CPM, Ad network 2 having the second highest CPM and Ad network 3 the lowest CPM. Performance scores are then retrieved from the system's database and a prioritized list of the ad networks is constructed by the systems selection module. As Ad network 2 has very high performance score, it has the highest ECPM and is the first on the list, second is Ad network 1 and third is Ad network 3. Now, as this mid-roll ad spot has high VTR, a preference for high VTR ad spots defined by Ad network 3 is considered and ECPM of Ad network 3 is increased by 20%, making it second on an amended prioritized list, after Ad network 2. Ad network 2 is selected by the selection module and the network interface then instructs Ad network 2 to provide a video ad. The system's monitoring module monitors the response of Ad network 2 and discovers the response was empty. Mean transfer time for Ad network 2 is updated in to the database, and Ad network 3, the next on the list, is selected to provide the video ad. The response is again monitored, and it is discovered that the response was not empty, but the video ad failed to play. Mean transfer time for Ad network 3 is updated in the database, and Ad network 1, the next on the list, is selected to provide the video ad. The response is again monitored and it is discovered that the ad successfully played. Performance parameters for Ad network 1 are then updated in the database.

It is expected that during the life of a patent maturing from this application many relevant real-time bidding processes will be developed and the scope of the term real-time bidding is intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of maximizing a usage of ad spots embedded in media content items by optimizing a selection of an advertisement (ad) network for providing promotional content to be presented in an ad spot, to improve response time and stability of provisioning in-stream ads, comprising:

monitoring, by a network server, a performance of each of a plurality of ad networks, in a response to at least one ad request received through an input of a network interface, from a client, for embedding an ad in an ad spot;

receiving, by said network server, at least one demand from at least one of said plurality of ad networks through said network interface, said at least one demand is a member of a group consisting of preference of a respective ad network to evenly spread plurality of ads of the respective ad network throughout serving period and boosting under-performing guaranteed impressions volumes related to the respective ad network;

assigning, by said network server, a performance score to each of said plurality of ad networks based on said monitoring, said performance score is calculated according to at least one ad network performance parameter determined during said monitoring, wherein said at least one ad network performance parameter is a member of a group consisting of:
- a total number of impressions on ads delivered by a specific ad network of said plurality of ad networks in relation to a number of requests sent to said specific ad network,
- a number of lost requests by said specific ad network in relation to a number of requests sent to said specific ad network,
- mean transfer time for responses received from said specific ad network, and
- a number of displayed ads in relation to a number of requests made to said specific ad network;

constructing, by said network server, a ranked set of data values of said plurality of ad networks for a bidding process according to said performance score of each of said plurality of ad networks and a plurality of bid responses received by each of said plurality of ad networks;

storing said ranked set of data values in a database;

automatically selecting, by said network server, an ad network from said plurality of ad networks according to said ranked set of data values and said at least one demand, said automatic selection is optimized to improve at least one of response time and stability of providing in-stream ads; and controlling a direct transmission of an ad from said plurality of ad networks directly to said client, by instructing, by said network server, through said network interface, said selected ad network to provide an ad directly to said client for presentation to a user on top of a client platform as an embedded in-stream ad in presented media content.

2. The method of claim 1, further comprising:
updating said performance score of said selected ad network according to a performance of said selected ad network, to be used in future selections.

3. The method of claim 1, further comprising:
selecting another ad network according to said ranked set of data values when said selected ad network fails to provide an ad after said selecting of said ad network.

4. The method of claim 1, wherein each of said at least one performance parameter is given different weight in said calculation of said performance score.

5. The method of claim 1, wherein said constructing of said ranked set of data values further include considering ad spot parameters according to preferences defined by at least one of said plurality of ad networks.

6. The method of claim 5, wherein said ad spot parameters include at least one of click-through rate and view-through rate in relation to said ad spot.

7. The method of claim 5, wherein at least one of said plurality of ad networks is removed from said ranked set of data values according to said preferences.

8. A non-transitory computer readable medium comprising computer executable instructions that when executed by at least one hardware processor, cause said at least one hardware processor to:
monitor a performance of each of a plurality of ad networks, in a response to at least one ad request received through an input of a network interface, from a client for embedding an ad in an ad spot;
receive at least one demand from at least one of said plurality of ad networks through said network interface, said at least one demand is a member of a group consisting of preference of a respective ad network to evenly spread plurality of ads of the respective ad network throughout serving period and boosting under-performing guaranteed impressions volumes related to the respective ad network;
assign a performance score to each of said plurality of ad networks based on said monitoring, said performance score is calculated according to at least one ad network performance parameter determined during said monitoring, wherein said at least one ad network performance parameter is a member of a group consisting of:
- a total number of impressions on ads delivered by a specific ad network of said plurality of ad networks in relation to a number of requests sent to said specific ad network,
- a number of lost requests by said specific ad network in relation to a number of requests sent to said specific ad network,
- mean transfer time for responses received from said specific ad network, and
- a number of displayed ads in relation to a number of requests made to said specific ad network;

construct a ranked set of data values of said plurality of ad networks for a bidding process according to said performance score of each of said plurality of ad networks and a plurality of bid responses received by each of said plurality of ad networks;

store said ranked set of data values in a database;

automatically select an ad network from said plurality of ad networks according to said ranked set of data values and said at least one demand, said automatic selection is optimized to improve at least one of response time and stability of providing in-stream ads; and control a direct transmission of an ad from said plurality of ad networks directly to said client, by instructing, through said network interface, said selected ad network to provide an ad directly to said client for presentation to a user on top of a client platform as an embedded in-stream ad in presented media content.

9. An advertisement (ad) system of maximizing a usage of ad spots embedded in media content items by optimizing a selection of a promotional content to be presented in an ad spot, to improve response time and stability of provisioning in-stream ads, comprising:
at least one network server comprising:
at least one network interface;
a database storage;
at least one hardware data processor to execute code instructions for:
receiving at least one demand from at least one of said plurality of ad networks through an input of said at least one network interface, said at least one demand is a member of a group consisting of preference of a respective ad network to evenly spread plurality of ads of the respective ad network throughout serving period and boosting under-performing guaranteed impressions volumes related to the respective ad network;
evaluating a plurality of ad network performance parameters for each of a plurality of ad networks, said plurality of ad network performance parameters are members of a group consisting of:
- a total number of impressions on ads delivered by a specific ad network of said plurality of ad networks in relation to a number of requests sent to said specific ad network,
- a number of lost requests by said specific ad network in relation to a number of requests sent to said specific ad network, mean transfer time for responses received from said specific ad network, and a number of displayed ads in relation to a number of requests made to said specific ad network;

storing in a database said ad network performance parameters for said plurality of ad networks;

receiving, through said at least one network interface, an ad request from a client for embedding ad in an ad spot;

sending said request to said plurality of ad networks, through an output of said at least one network interface;

receiving, through said at least one network interface, bids for said ad spot from said plurality of ad networks;

constructing a ranked set of data values of said plurality of ad networks according to said ad network performance parameters and said bids;

storing said ranked set of data values in said database storage;

automatically selecting a selected ad network for responding to said ad request according to said ranked set of data values and said at least one demand, said automatic selection is optimized to improve at least one of response time and stability of providing in-stream ads; and controlling a direct transmission of an ad from said plurality of ad networks directly to said client, by instructing said selected ad network, through said network interface, to provide an ad directly to said client to be presented to a user on top of a client platform as an embedded in-stream ad in presented media content, in response to said ad request.

10. The method of claim 1, wherein said ad spot is a member in a group consisting of a part of a webpage, an application, a video and a search results on top different client platforms.

11. The method of claim 1, wherein each of said plurality of ad networks is a member of a group consisting of a blind network, a vertical network, a media company, a media agency, a media agency group, an ad exchanger and a technology vendor.

12. The method of claim 1, wherein said at least one demand includes request for enforcing at least one restriction, said at least one restriction is a member of a group consisting of geomarketing, domain, frequency capping at break, session and user levels.

13. The method of claim 1 wherein said at least one demand is preference of the respective ad network to evenly spread plurality of ads of the respective ad network throughout serving period.

14. The method of claim 1 wherein said at least one demand is for boosting under-performing guaranteed impressions volumes related to the respective ad network.

* * * * *